(12) United States Patent
Galvan et al.

(10) Patent No.: US 8,993,678 B2
(45) Date of Patent: *Mar. 31, 2015

(54) PIPES AND POLYOLEFIN COMPOSITION FOR THE MANUFACTURE THEREOF

(75) Inventors: Monica Galvan, Ferrara (IT); Claudio Cavalieri, Ferrara (IT); Francesca Tisi, S. Maria Maddalena (IT); Tiziana Caputo, Ferrara (IT)

(73) Assignee: Basell Polioefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/805,753

(22) PCT Filed: Jun. 8, 2011

(86) PCT No.: PCT/EP2011/059421
§ 371 (c)(1),
(2), (4) Date: Dec. 20, 2012

(87) PCT Pub. No.: WO2011/160945
PCT Pub. Date: Dec. 29, 2011

(65) Prior Publication Data
US 2013/0095266 A1  Apr. 18, 2013

Related U.S. Application Data

(60) Provisional application No. 61/398,656, filed on Jun. 29, 2010.

(30) Foreign Application Priority Data

Jun. 23, 2010  (EP) .................................. 10167035

(51) Int. Cl.
| | | |
|---|---|---|
| C08F 8/00 | (2006.01) | |
| C08L 23/04 | (2006.01) | |
| C08L 23/10 | (2006.01) | |
| C08L 23/14 | (2006.01) | |
| C09D 4/00 | (2006.01) | |
| F16L 9/12 | (2006.01) | |
| F16L 9/147 | (2006.01) | |
| F16L 11/14 | (2006.01) | |
| C08L 23/08 | (2006.01) | |

(52) U.S. Cl.
CPC .............. *C08L 23/14* (2013.01); *C08L 23/142* (2013.01); *C09D 4/00* (2013.01); *F16L 9/12* (2013.01); *F16L 9/147* (2013.01); *F16L 11/14* (2013.01); *C08L 23/0815* (2013.01); *C08L 2207/02* (2013.01)
USPC ........................................... 525/191; 525/240

(58) Field of Classification Search
USPC ................................................ 525/191, 240
See application file for complete search history.

(56) References Cited

U.S. PATENT DOCUMENTS

| | | | |
|---|---|---|---|
| 4,399,054 A | | 8/1983 | Ferraris et al. |
| 8,487,045 B2 * | | 7/2013 | Cavalieri et al. .............. 525/191 |

FOREIGN PATENT DOCUMENTS

| | | |
|---|---|---|
| CN | 101184609 A | 5/2008 |
| EP | 045977 | 2/1982 |
| EP | 361493 | 4/1990 |
| EP | 0395083 | 10/1990 |
| EP | 0728769 | 8/1996 |
| EP | 0782587 | 7/1997 |
| EP | 2022824 | 2/2009 |
| WO | WO-0063261 | 10/2000 |
| WO | WO-03037981 | 5/2003 |
| WO | WO-2005014713 | 2/2005 |
| WO | WO-2005040271 | 5/2005 |
| WO | WO-2006/002778 | 1/2006 |
| WO | WO-2006114358 | 11/2006 |
| WO | WO-2008077773 | 7/2008 |
| WO | WO-2010072841 | 7/2010 |
| WO | WO-2011160946 | 12/2011 |
| WO | WO-2011160953 | 12/2011 |

* cited by examiner

*Primary Examiner* — Nathan M Nutter

(57) ABSTRACT

A heterophasic polypropylene composition comprising (percent by weight referred to the sum of components A) and B)):
A) from 80% to 97% of a random copolymer of propylene containing from 0.1 to 4% of 1-hexene derived units;
B) from 3-20% of a copolymer of propylene and ethylene having a content of ethylene derived units ranging from 50% to 55% extremes excluded; wherein the heterophasic polypropylene composition is endowed with a Melt Flow Rate: measured according to ISO 1133 (230° C., 5 Kg) ranging from 0.5 to 5 g/10 min; and an intrinsic viscosity (IV) of the fraction soluble in xylene at room temperature ranging from 2.5 to 5.5.

9 Claims, No Drawings ns
PIPES AND POLYOLEFIN COMPOSITION FOR THE MANUFACTURE THEREOF

This application is the U.S. national phase of International Application PCT/EP2011/059421, filed Jun. 8, 2011, claiming priority to European Patent Application 10167035.4 filed Jun. 23, 2010, and the benefit under 35 U.S.C. 119(e) of U.S. Provisional Application No. 61/398,656, filed Jun. 29, 2010; the disclosures of International Application PCT/EP2011/059421, European Patent Application 10167035.4 and U.S. Provisional Application No. 61/398,656, each as filed, are incorporated herein by reference.

The present invention relates to heterophasic polypropylene based composition containing 1-hexene derived units and the use of said composition for the production of pipes. Polymer materials are frequently used for manufacturing pipes for various purposes, such as fluid transport, during which the fluid may be non-pressurised or pressurised. In pressure pipes, the transported fluid may have varying temperatures, usually within the range of about 0° C. to about 70° C. Such pipes are typically made of polyolefins, usually polyethylene or polypropylene. The temperatures in e.g. a hot water pipe, typically used for plumbing and heating purposes, range from 30° C. to 70° C. which means that the pipe must be able to withstand a higher temperature than that for a secure long term use. The good thermal resistance of polypropylene compared with other polyolefins is particularly useful for applications such as hot water pipes as mentioned above.

A further problem of the pipe obtained by polymer materials is handling. During the handling of the pipe they could be broken by accidental hurts. For this reason high izod impact strength is required.

WO-A1-2005/040271 relates to pipes comprising a resin formed from (A) 70 to 90 wt % of a random copolymer comprising units of propylene and from 0.2 to 5 wt %, preferably from 0.5 to 2 wt % of units of a $C_2$-$C_{10}$ α-olefin, having an MFR of 0.1-5 g/10 min, and (B) 10 to 30 wt % of an elastomer comprising units of propylene and from 30 to 55 wt % preferably from 40 to 50 wt % of units of ethylene. The MFR of the resin is from 0.1 to 2 g/10 mins. The resin comprises preferably at least 80% of the random copolymer fraction, more preferably between 82% and 88%.

In the examples, the random copolymer of propylene (A) comprises units of 1-hexene and the ethylene content in the elastomer (B) is equal to 45 wt %.

The applicant found that it is possible to improve the properties of heterophasic resins by finely tuning the various variables so that to obtain a resin that has an improved balancement between rigidity, has shown by the values of flexural modulus and tensile properties, and environmental crack resistance.

Thus an object of the present invention is a heterophasic polypropylene composition comprising (percent by weight referred to the sum of components A) and B)):

A) from 80% to 97%, preferably from 85% to 92% of a random copolymer of propylene containing from 0.1 to 4.0%, preferably from 0.1 to 1.5%, more preferably from 0.3 to 0.9% even more preferably from 0.3 to 0.7% of 1-hexene derived units; said random copolymers of propylene having:
a Melt Flow Rate: measured according to ISO 1133 (230° C., 5 Kg) ranging from 0.3 to 5.0 g/10 min; preferably from 0.5 to 3 g/10 min; more preferably from 1.0 to 2.0 g/10 min;
a polydispersity index (PI) ranging from 4 to 10, preferably from 5 to 6.

B) from 3 to 20% preferably from 8% to 15% of a copolymer of propylene and ethylene having a content of ethylene derived units ranging from 50% to 55% extremes excluded; preferably ranging from 51% to 54%; even more preferably from 51% to 53%;

wherein the heterophasic polypropylene composition is endowed with a Melt Flow Rate: measured according to ISO 1133 (230° C., 5 Kg) ranging from 0.5 to 5.0 g/10 min; preferably from 0.5 to 3.0 g/10 min and an intrinsic viscosity (IV) of the fraction soluble in xylene at room temperature ranging from 2.0% to 5.0% preferably from 2.5% to 5.5%; more preferably from 3.0% to 5.0%; even more preferably from 3.5% to 4.5%.

Preferably the fraction soluble in xylene at room temperature of the heterophasic polypropylene composition fulfils the following relation:

$$XS < \% B + 3$$

Wherein Xs is the fraction soluble in xylene and % B is the amount (percentage) of component B);
preferably the relation is XS<% B+2.5; more preferably XS<% B+1; even more preferably XS<% B.

Preferably the heterophasic polypropylene composition of the present invention is endowed with a flexural modulus higher than 1200 MPa; preferably higher than 1300 MP; more preferably higher than 1400 MPa even more preferably higher than 1500 MPa.

The term "copolymer" as used in the present patent application also refers to copolymers prepared by the polymerization of two different types of monomers.

The heterophasic polypropylene composition of the present invention can be advantageously used for the preparation of pipes.

Thus a further object of the present invention is a pipe comprising the heterophasic polypropylene composition of the present invention.

Preferably the pipe according to the present invention shows an hydraulic pressure resistance (ISO method 1167-1, measured on a pipe at a nominal diameter of 32 mm and wall thickness of 2.9 mm) measured at 80° C. and a pressure of 4.2 MPa higher than 3000 hours; more preferably higher than 4000 hours; even more preferably higher than 5000 hours even more preferably higher than 5500 hours.

Preferably the pipe according to the present invention shows an hydraulic pressure resistance (ISO method 1167-1, measured on a pipe at a nominal diameter of 32 mm and wall thickness of 2.9 mm) measured at 95° C. and a pressure of 2 MPa higher than 5000 hours; more preferably higher than 6000 hours; even more preferably higher than 7000 hours even more preferably higher than 7700 hours.

The term "pipe" as used herein also includes pipe fittings, valves and all parts which are commonly necessary for e.g. a hot water piping system. Also included within the definition are single and multilayer pipes, where for example one or more of the layers is a metal layer and which may include an adhesive layer.

The above heterophasic polyolefin composition can also be used for the manufacture of articles other than pipes, such as shock-resistant articles that need to exhibit good mechanical properties even at low temperatures, e.g. car bumpers and the like.

Such articles can be manufactured through a variety of industrial processes well known in the art, such as for instance moulding, extrusion, and the like.

In a further embodiment of the invention, the heterophasic polyolefin composition further comprises an inorganic filler agent in an amount ranging from 0.5 to 60 parts by weight with respect to 100 parts by weight of the said heterophasic polypropylene composition. Typical examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

The heterophasic polyolefin composition of the invention is also suitable for providing polypropylene pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends. Pipes and articles made from the heterophasic polyolefin composition of the invention also show very good creep and haze properties.

The heterophasic polyolefin composition may be prepared in accordance with the well-known polymerization processes.

The process for preparing the previously said heterophasic composition can be carried out by a sequential polymerization comprising at least two sequential steps, wherein components A) and B) are prepared in separate subsequent steps, operating in each step, except the first step, in the presence of the polymer formed and the catalyst used in the preceding step. The catalyst is preferably added only in the first step, because its activity is usually such that it is still active for all the subsequent steps. Component A) is preferably prepared in a single polymerization stage. The order of the polymerization stages is not a critical process feature, however component A) is preferably prepared before component B).

The polymerisation can occur in liquid phase, gas phase or liquid-gas phase.

For example, it is possible to carry out the propylene polymerisation stage using liquid propylene as diluent, and the following copolymerisation stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerisation in a cascade of stirred gas-phase reactors that are connected in series and in which the pulverulent reaction bed is kept in motion by means of a vertical stirrer. The reaction bed generally comprises the polymer that is polymerised in the respective reactor.

Reaction time, pressure and temperature relative to the polymerisation steps are not critical, however it is best if the temperature is from 20 to 150° C., in particular from 50 to 100° C. The pressure can be atmospheric or higher.

The regulation of the molecular weight is carried out by using known regulators, hydrogen in particular.

According to a particularly preferred embodiment the said heterophasic polyolefin compositions are prepared by a sequential polymerization process comprising the preparation of component A) in a first gas-phase polymerization apparatus comprising two interconnected polymerization zones and a second step in which the propylene, ethylene-copolymer is prepared by polymerizing the monomers in a separate fluidized bed reactor.

A gas-phase polymerization apparatus performing the first step of the process is illustrated in patent application EP-A1-782587.

In detail, the said process comprises feeding one or more monomer(s) to said polymerisation zones in the presence of catalyst under reaction conditions and collecting the polymer product from the said polymerisation zones. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, and is preferably from 0.8 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 and 120° C.

The operating pressure can range between 0.5 and 10 MPa, preferably between 1.5 to 6 MPa. Advantageously, at least one inert gas is maintained in the polymerisation zones, in such quantities that the sum of the partial pressures of the inert gases is preferably between 5 and 80% of the total pressure of the gas. The inert gas can be nitrogen or propane, for example.

The polymer leaving said first polymerization apparatus is discharged from the downcomer to a gas-solid separator then collected and transferred to the second stage which is preferably carried out in a conventional fluidized-bed gas-phase reactor operating under conventional conditions of temperature and pressure.

Preferably, the various catalyst components are fed to the riser at any point of the said riser. However, they can also be fed at any point of the downcomer. The catalyst can be in any physical state, therefore catalysts in either solid or liquid state can be used.

The preferred catalysts to be used in the present polymerization process are Ziegler-Natta catalysts comprising a solid catalyst component including a titanium compound having at least one titanium-halogen bond, and an electron-donor compound, both supported on a magnesium halide in active form as preferred support, optionally with silica as co-support. Catalysts having the above mentioned characteristics are well known in the patent literature; particularly advantageous are the solid catalyst components used in the catalysts described in patent documents U.S. Pat. No. 4,399,054, EP-A2-045977 and EP-A2-395083.

The solid catalyst components used in the said catalysts comprise, as electron-donor compounds (internal electron-donor compounds), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzyl-butyl phthalate, and esters of succinic acids.

Particularly suitable internal electron donor compounds are selected from succinates disclosed in international patent application WO-A1-00/63261.

Other electron-donors particularly suitable are 1,3-diethers described, for example, in European patent applications EP-A1-361493 and EP-A1-728769.

The preparation of the above mentioned catalyst components is carried out according to various methods. For example, a $MgCl_2 \cdot nROH$ adduct (in particular in the form of spherical particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Ziegler-Natta catalysts also comprise a co-catalyst, i.e. an organoaluminum compound, such as an aluminum alkyl compound. An external donor is optionally added to the organoaluminium compound.

The Al-alkyl compounds used as co-catalysts comprise the Al-trialkyls, such as Al-triethyl, Al-triisobutyl, Al-tributyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates and in particular silicon compounds containing at least one Si—OR bond, where R is a hydrocarbon radical. Useful examples of silicon compounds are $(tert\text{-}butyl)_2Si(OCH_3)_2$, $(cyclopentyl)_2Si(OCH_3)_2$, $(cyclohexyl)(methyl)Si(OCH_3)_2$ and $(phenyl)_2Si(OCH_3)_2$.

1,3-diethers having the formulae described above can also be used advantageously.

If the internal donor is one of these dieters, the external donors can be omitted.

Prior to the polymerisation process, the catalysts can be precontacted with small quantities of olefins (prepolymerisation), thus improving both the performance of the catalysts and the morphology of the polymers. Prepolymerisation is carried out maintaining the catalysts in suspension in a hydrocarbon solvent (hexane or heptane, for example) and polymerising at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component.

Articles, pressure pipes and related fittings according to the present invention are produced in a manner known per se, e.g. by (co-)extrusion or moulding, for instance. Extrusion of articles can be made with different type of extruders for polyolefin, e.g. single or twin screw extruders.

A further embodiment of the present invention is a process wherein the said heterophasic polymer composition is moulded into said articles.

Due to high flowability of the polymer composition used the extrusion process requires lower pressure or temperatures in the die than that required when conventional olefin polymers are used even if they have higher melt flow rate. For example, the value of pressure can be reduced of about 10%.

When the pipes are multi-layer, at least one layer is made of the propylene polymer composition described above. The further layer(s) is/are preferably made of an amorphous or crystalline polymer (such as homopolymer and co- or terpolymer) of $R\text{—}CH\text{=}CH_2$ olefins, where R is a hydrogen atom or a $C_1\text{-}C_6$ alkyl radical. Particularly preferred are the following polymers:

1) isotactic or mainly isotactic propylene homopolymers;
2) random co- and terpolymers of propylene with ethylene and/or $C_4\text{-}C_8$ α-olefin, such as 1-butene, 1-hexene, 1-octene, 4-methyl-1-pentene, wherein the total comonomer content ranges from 0.05% to 20% by weight, or mixture of said polymers with isotactic or mainly isotactic propylene homopolymers;
3) heterophasic polymer blends comprising (a) a propylene homopolymer and/or one of the co- and terpolymers of item (2), and an elastomeric moiety (b) comprising co- and terpolymers of ethylene with propylene and/or a $C_4\text{-}C_8$ α-olefin, optionally containing minor amounts of a diene, the same disclosed for polymer (2)(a); and
4) amorphous polymers such as fluorinated polymers, polyvinyl difluoride (PVDF) for example.

In multi-layer pipes the layers of the pipe can have the same or different thickness.

The following examples are given to illustrate but not limit the present invention.

EXAMPLES

The following analytical methods were used to characterise the polymer compositions pipes obtained therefrom.

Melt Flow Rate: measured according to ISO 1133 (230° C., 5 Kg).

[η] intrinsic viscosity: Determined in tetrahydronaphtalene at 135° C.

Xylene-soluble fraction (XS) at 25° C.: 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene and 1-hexene content: Determined by I.R. Spectroscopy. The infrared spectrum of a pressed film of the polymer is recorded in absorbance vs. wavenumbers ($cm^{-1}$). The area of the combination band between 4482 and 3950 $cm^{-1}$ is used for spectrometric normalization of film thickness. A Partial Least Squares (PLS) calibration is applied to the range 790-760 cm-1 in order to determine ethylene and hexene % by weight.

Polidispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. The value of the polydispersity index is derived from the crossover modulus by way of the equation: $P.I.=10^5/Gc$ in which Gc is the crossover modulus defined as the value (expressed in Pa) at which G'=G" wherein G' is the storage modulus and G" is the loss modulus.

Elongation at yield: measured according to ISO 527.
Elongation at break: measured according To ISO 527.
Stress at break: measured according to ISO 527.
Izod impact resistance, notched: according to ISO method 180/1A.
Resistance to hydraulic pressure: According to ISO method 1167-1, tests were carried out at temperature of 80° C. and under a circumferential stress of 4.2 MPa and at 95° C. under a circumferential stress of 2.5 MPa.

Example 1

Preparation of the Solid Catalyst Component

Into a 500 mL four-necked round flask, purged with nitrogen, 250 ml of $TiCl_4$ are introduced at 0° C. While stirring, 10.0 g of microspheroidal $MgCl_2 \cdot 1.8C_2H_5OH$ (prepared according to the method described in ex.2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off Then the following operations are repeated twice: 250 ml of fresh $TiCl_4$ are added, the mixture is reacted at 120° C. for 60 min and the supernatant liquid is siphoned off The solid is washed six times with anhydrous hexane (6×100 mL) at 60° C.

Polymerization

The catalyst system was formed by the catalyst component prepared as described above, triethylaluminium (TEAL) as co-catalyst and dicyclopentyldimethoxysilane as external donor, with the weight ratios indicated in the following Tables.

The propylene polymer compositions of the examples were prepared in a two-step polymerization process, wherein the random copolymer A) was prepared in the first polymerization step by feeding the monomers and the catalyst system into a gas-phase polymerization reactor comprising two interconnected polymerization zones, a riser and a downcomer, as described in the European Patent EP-A1-782587. The polymerization mixture was discharged from said reactor, conveyed to a gas-solid separator and the polymerized material was sent into a conventional gas-phase fluidized-bed reactor where the polymer of ethylene B) was produced. The operative conditions are indicated in the Table 1.

The polymer particles exiting from the second polymerization step were subjected to a steam treatment to remove the unreacted monomers and dried. The characteristics of the obtained polymer are reported on table 2

TABLE 1

| Example | | 1 |
|---|---|---|
| Component A | | |
| TEAL/external donor | wt/wt | 4 |
| TEAL/catalyst | wt/wt | 5 |
| Temperature | ° C. | 80 |
| Pressure | Bar-g | 27 |
| Split holdup | | |
| riser | wt % | 40 |
| downcomer | wt % | 60 |
| H2/C3 riser | mol/mol | 0.004 |
| C6/(C6 + C3) | mol/mol | 0.013 |
| MFR | g/10 min | 1.1 |
| C6 total content | wt % | 0.4 |
| XS | wt % | <2 |
| Tm | ° C. | 157 |
| Component B | | |
| Temperature | ° C. | 78 |
| Pressure | MPa | 1.5 |
| Split | % | 10 |
| C2/C2 + C3 | | 0.41 |
| H2/C2 | | 0.01 |

C3 = propylene;
C2 = ethylene;
C6 = 1-hexene

Comparative example 1 is example 2 of WO 2005/040271;

TABLE 2

| | | Example 1 | Comparative ex. 1 |
|---|---|---|---|
| Component A | | | |
| 1-hexene | Wt % | 0.4 | 1.0 |
| PI | | 5.2 | — |
| MFR | g/10 min | 1.2 | 2.5-3 |
| XS | % | <2 | — |
| Component B | | | |
| % component B | % | 10 | 15 |
| Ethylene | Wt % | 52 | 45 |
| Total polymer | | | |
| MFR | g/10 min | 1 | 1.2 |
| Ethylene total content | Wt % | 5 | 6.4 |
| XS | % | 10 | — |
| XSIV | dl/g | 4 | — |

XS = xylene solubles;
XSIV = intrinsic viscosity of the xylene solubles

To the polymer produced in Example 1 the additives reported on table 3 have been added.

TABLE 3

|  | % wt |
| --- | --- |
| DSTDP | 0.33 |
| TALC | 1.0 |
| CA STEARATE - M | 0.05 |
| IRGAFOS 168 | 0.11 |
| IRGANOX 1010 | 0.22 |
| IRGANOX 1330 | 0.11 |

In Table 4 the mechanical properties of the polymer of example 1 are compared with the properties of the comparative example 1.

TABLE 4

| | | Example 1 | Comparative Ex 1 |
| --- | --- | --- | --- |
| Flexural Modulus 24 h | MPa | 1800 | 1057 |
| Izod at 23° C. h | kJ/m2 | 49.9 | — |
| Izod at 0° C. | kJ/m2 | 14.3 | — |
| Izod at −20° C. | kJ/m2 | 8.3 | — |
| Tens. Str. @ yield 24 h | MPa | 32 | — |
| Elong. @ yield | % | 8 | — |
| Tens. Str. @ break | MPa | 23.5 | — |
| Elong. @ break | % | 22 | — |
| Tm | ° C. | 157 | — |
| Tc | ° C. | 112.3 | — |
| +Hydraulic pressure resistance 80° C. 4.2 MPa | h | >6000* | ⁻665 |
| +Hydraulic pressure resistance 95° C. 2.5 MPa | h | >8000* | — |

*At the value indicated in table 3 the pipes are not broken. The tests have been interrupted.
+determinated with a pipe at a nominal diameter of 32 mm and wall thickness of 2.9 mm.

From table 3 clearly results that the polymer according to the present invention shows an improved tensile modulus and an improved resistance at hydraulic pressure, that make this material fit for the production of pipes.

The invention claimed is:

1. A heterophasic polypropylene composition comprising (percent by weight referred to the sum of components A) and B)):
A) from 80 to 97%, based upon the total weight of the heterophasic polypropylene composition, of a random copolymer of propylene and 1-hexene derived units, wherein the random copolymer of propylene and 1-hexene contains from 0.1 to less than 0.5 wt. %, based upon the total weight of the random copolymer of propylene and 1-hexene, of 1-hexene derived units, and wherein the random copolymers of propylene and 1-hexene has:
   (i) a Melt Flow Rate: measured according to ISO 1133 (230° C., 5 Kg) ranging from 0.3 to 5 g/10 min;
   (ii) a polydispersity index (PI) ranging from 4 to 10; and
B) from 3-20%, based upon the total weight of the heterophasic polypropylene composition, of a copolymer of propylene and ethylene, wherein the copolymer of propylene and ethylene has a content of ethylene derived units between 50% to 55%, based upon the total weight of the copolymer of propylene and ethylene;
wherein the heterophasic polypropylene composition has a Melt Flow Rate: measured according to ISO 1133 (230° C., 5 Kg) ranging from 0.5 to 5 g/10min; and an intrinsic viscosity (IV) of the fraction soluble in xylene at room temperature ranging from 2.0 to 5.0 dl/g.

2. The heterophasic polypropylene composition according to claim 1 wherein in component A) the content of 1-hexene derived units ranges from 0.1 to 0.4 wt. %.

3. The heterophasic polypropylene composition according to claim 1 wherein in component A) the content of 1-hexene derived units is about 0.4 wt. %.

4. The heterophasic polypropylene composition according to claim 1 wherein the content of ethylene derived units in component B ranges from 51 wt. % to 54 wt. %.

5. The heterophasic polypropylene composition according to claim 1 wherein the amount of component A) ranges from 85 wt. % to 92 wt. % and the amount of component B ranges from 8 wt. % and 15 wt. %.

6. A pipe comprising the heterophasic polypropylene composition of claim 1.

7. The pipe according to claims 6 wherein the pipe has a hydraulic pressure resistance, measured at 80° C. and a pressure of 4.2 MPa, of longer than 3000 hours.

8. The pipe according to claim 6 wherein the pipe has hydraulic pressure resistance, measured at 95° C. and a pressure of 2 MPa, of longer than 5000 hours.

9. The hterophasic polypropylene of claim 1 wherein component
A) has a Poydispersity Index of 5 to 6.

* * * * *